US008806266B1

(12) United States Patent
Qu et al.

(10) Patent No.: US 8,806,266 B1
(45) Date of Patent: Aug. 12, 2014

(54) HIGH AVAILABILITY USING FULL MEMORY REPLICATION BETWEEN VIRTUAL MACHINE INSTANCES ON A NETWORK DEVICE

(75) Inventors: Hui Qu, Santa Clara, CA (US); Mu Lin, Sunnyvale, CA (US); Shine-Chu Wang, Sunnyvale, CA (US); Heng-Hui Debbie Chu, Palo Alto, CA (US); Leyi Zhang, Cupertino, CA (US); Zi Zhou, Sunnyvale, CA (US); Joel Obstfeld, Bushey Herts (GB)

(73) Assignee: Juniper Networks, Inc., Sunnyvale, CA (US)

( * ) Notice: Subject to any disclaimer, the term of this patent is extended or adjusted under 35 U.S.C. 154(b) by 429 days.

(21) Appl. No.: 13/247,571

(22) Filed: Sep. 28, 2011

(51) Int. Cl.
*G06F 11/00* (2006.01)

(52) U.S. Cl.
USPC ............................................ 714/4.11; 714/13

(58) Field of Classification Search
CPC ............ G06F 2201/84; G06F 11/1458; G06F 9/45558; G06F 9/45533; G06F 9/5077; G06F 2009/45562; G06F 11/1484; G06F 2009/4557; G06F 11/1469; G06F 11/2038; G06F 11/1464; G06F 2009/45595; G06F 11/1461
See application file for complete search history.

(56) References Cited

U.S. PATENT DOCUMENTS

| | | | |
|---|---|---|---|
| 6,795,966 B1 * | 9/2004 | Lim et al. ......................... 718/1 |
| 7,003,692 B1 | 2/2006 | Banks et al. |
| 7,275,081 B1 | 9/2007 | Katz et al. |
| 7,359,377 B1 | 4/2008 | Kompella et al. |
| 7,739,403 B1 * | 6/2010 | Balakrishna et al. ......... 709/242 |
| 7,804,769 B1 | 9/2010 | Tuplur et al. |
| 7,814,995 B2 | 10/2010 | Clauseh et al. |
| 8,055,933 B2 | 11/2011 | Jaehde et al. |
| 8,190,720 B1 | 5/2012 | Yellai et al. |
| 8,245,217 B2 | 8/2012 | Raman et al. |
| 8,291,258 B2 | 10/2012 | Narayanaswamy et al. |
| 8,352,558 B2 | 1/2013 | Boctor et al. |
| 8,495,618 B1 | 7/2013 | Inbaraj et al. |
| 2002/0073135 A1 | 6/2002 | Meyer |
| 2004/0042395 A1 | 3/2004 | Lu et al. |
| 2005/0289540 A1 | 12/2005 | Nguyen et al. |
| 2006/0233182 A1 | 10/2006 | Appanna et al. |

(Continued)

OTHER PUBLICATIONS

U.S. Appl. No. 12/182,619 entitled Streamlined Packet Forwarding Using Dynamic Filters For Routing And Security In A Shared Forwarding Plane, filed Jul. 30, 2008.

(Continued)

*Primary Examiner* — Scott Baderman
*Assistant Examiner* — Jason Bryan
(74) *Attorney, Agent, or Firm* — Shumaker & Sieffert, P.A.

(57) ABSTRACT

Techniques are described for providing high availability for a network device, e.g., a router, using full memory replication between a primary virtual machine (VM) and a standby VM running on the network device. In one example, the techniques provide hot-standby high availability for a router by initializing a primary VM and a standby VM on the router at the same time. In another example, the techniques provide high availability for the router by initializing a standby VM on the router upon detecting a failure of the primary VM. In both examples, the primary VM controls the routing functionality and periodically stores a full memory state. Upon a failure of the primary VM, a hypervisor may perform a full memory replication between the primary VM and the standby VM. The standby VM may then take control of the routing functionality at the last stored state of the memory.

27 Claims, 8 Drawing Sheets

(56) References Cited

U.S. PATENT DOCUMENTS

| | | |
|---|---|---|
| 2007/0083723 A1 | 4/2007 | Dey et al. |
| 2007/0169083 A1 | 7/2007 | Penubolu et al. |
| 2007/0255764 A1 | 11/2007 | Sonnier et al. |
| 2008/0034365 A1 | 2/2008 | Dahlstedt |
| 2008/0244552 A1 | 10/2008 | Toeroe |
| 2008/0244577 A1 | 10/2008 | Le et al. |
| 2009/0089774 A1 | 4/2009 | Lynch et al. |
| 2009/0100418 A1 | 4/2009 | Raman et al. |
| 2009/0327648 A1 | 12/2009 | Savagaonkar et al. |
| 2010/0057843 A1 | 3/2010 | Landsman et al. |
| 2010/0107158 A1* | 4/2010 | Chen et al. .................. 718/1 |
| 2010/0115512 A1 | 5/2010 | Sakai |
| 2010/0306770 A1 | 12/2010 | Frank |
| 2011/0173490 A1 | 7/2011 | Narayanaswamy et al. |
| 2012/0072893 A1 | 3/2012 | Gupta et al. |
| 2012/0185914 A1 | 7/2012 | Delco et al. |
| 2013/0042323 A1 | 2/2013 | Narayanaswamy et al. |
| 2013/0145359 A1 | 6/2013 | Hanselmann |
| 2013/0191340 A1 | 7/2013 | Ammanur et al. |

OTHER PUBLICATIONS

Chandra et al. "Capabilities Advertisement with BGP-4", RFC 2842, Network Working Group, May 2000, 4pgs.

* cited by examiner

HIGH AVAILABILITY USING FULL MEMORY REPLICATION BETWEEN VIRTUAL MACHINE INSTANCES ON A NETWORK DEVICE

TECHNICAL FIELD

Techniques of this disclosure relate generally to computer networks, and more particularly to high availability for network devices.

BACKGROUND

A computer network is a collection of interconnected computing devices that exchange data and share resources. In a packet-based network, such as the Internet, the computing devices communicate data by dividing the data into small blocks called packets, which are individually routed across the network from a source device to a destination device. The destination device extracts the data from the packets and assembles the data into its original form. Dividing the data into packets enables the source device to resend only those individual packets that may be lost during transmission.

Certain devices within the network, such as routers, contain control units or routing engines that maintain routing information describing routes through the network. Each route defines a path between locations on the network. Large computer networks, such as the Internet, often include many routers that exchange routing information according to a defined routing protocol, such as the Border Gateway Protocol (BGP). From the routing information, a forwarding engine of the routers generates forwarding information, which is used by the routers to relay packet flows through the network and, more particularly to relay the packet flows to a next hop. Upon receiving an incoming packet, the router examines information within the packet to identify the destination for the packet. Based on the destination, the router forwards the packet in accordance with the forwarding information.

In some cases, a router may fail due to a failure of either the software system running on a routing engine or the underlying hardware of the routing engine. As a result of the failed router, customers of the computer network may lose service and routing information may need to be updated throughout the computer network to establish routes around the failed router. As one solution, a backup routing engine may be used to provide high availability (HA) for the router during operation of the routing functionality by the primary routing engine. In this case, if the primary routing engine of the router fails, the router may perform a graceful restart, e.g., graceful routing engine switchover (GRES), by replicating individual kernel states from the primary routing engine to the backup routing engine.

SUMMARY

In general, this disclosure includes techniques for providing high availability for a network device, e.g., a router, using full memory replication between a primary virtual machine (VM) and a standby VM executing on the network device. In a router, a control unit, e.g., a routing engine, may utilize a virtual machine executing within an operating environment of a hypervisor, instead of running directly on top of the hardware, to control routing functionality of the router. This makes it possible for multiple instances of operating systems to run simultaneously on a single control unit or routing engine. The techniques include initializing a second or standby virtual machine on either the same physical control unit as the first virtual machine or on a separate physical control unit of the router to provide high availability for the router using full memory replication.

In one example, the techniques provide hot-standby high availability for a network device by initializing a primary VM and a standby VM on the network device at the same time. In another example, the techniques provide high availability for the network device by initializing a standby VM on the network device upon detecting a failure of the primary VM. In both examples, the primary VM controls the routing functionality of the network device and periodically stores a full memory state. Upon a failure of the primary VM, the hypervisor may perform a full memory replication between the primary VM and the standby VM. The standby VM may then take control of the routing functionality of the network device at the last stored state of the memory of the primary VM.

According to the techniques, upon a failure of the primary VM, the hypervisor may perform a graceful restart to the standby VM by performing a full memory replication of the primary VM to the standby VM, instead of replicating multiple different kernel states, which requires knowledge of the kernel objects and their implementation via an operating system kernel. The full memory state of the primary VM may include, for example, one or more memory pages of all kernel states of the operating system kernel executing on the primary VM, an executable software image of the primary VM including a software system executed by the primary VM, and link states of the primary VM that comprise states of physical links between routers in a network that the standby VM may translate into kernel objects for whatever software system is executed by the standby VM.

In one example, a method comprises executing a first VM within an operating environment on a network device, wherein the first VM controls routing functionality of the network device, periodically storing a full memory state of the first VM, upon detecting a failure of the first VM, replicating the stored full memory state of the first VM to a second VM executing within the operating environment on the network device, and switching control of the routing functionality from the first VM to the second VM.

In another example, a network device comprises a hypervisor that provides an operating environment for one or more VMs on the network device, a first VM executing within the operating environment of the hypervisor, wherein the first VM controls routing functionality of the network device and periodically stores a full memory state of the first VM, and a second VM executing within the operating environment of the hypervisor. Upon detecting a failure of the first VM, the hypervisor included in the network device replicates the stored full memory state of the first VM to the second VM, and switches control of the routing functionality from the first VM to the second VM.

In a further example, a non-transitory, computer-readable storage medium comprising instructions that cause one or more programmable processors to execute a first VM within an operating environment on a network device, wherein the first VM controls routing functionality of the network device, periodically store a full memory state of the first VM, upon detecting a failure of the first VM, replicate the stored full memory state of the first VM to a second VM executing within the operating environment on the network device, and switch control of the routing functionality from the first VM to the second VM.

The details of one or more examples of the invention are set forth in the accompanying drawings and the description

DETAILED DESCRIPTION

Figure 1:
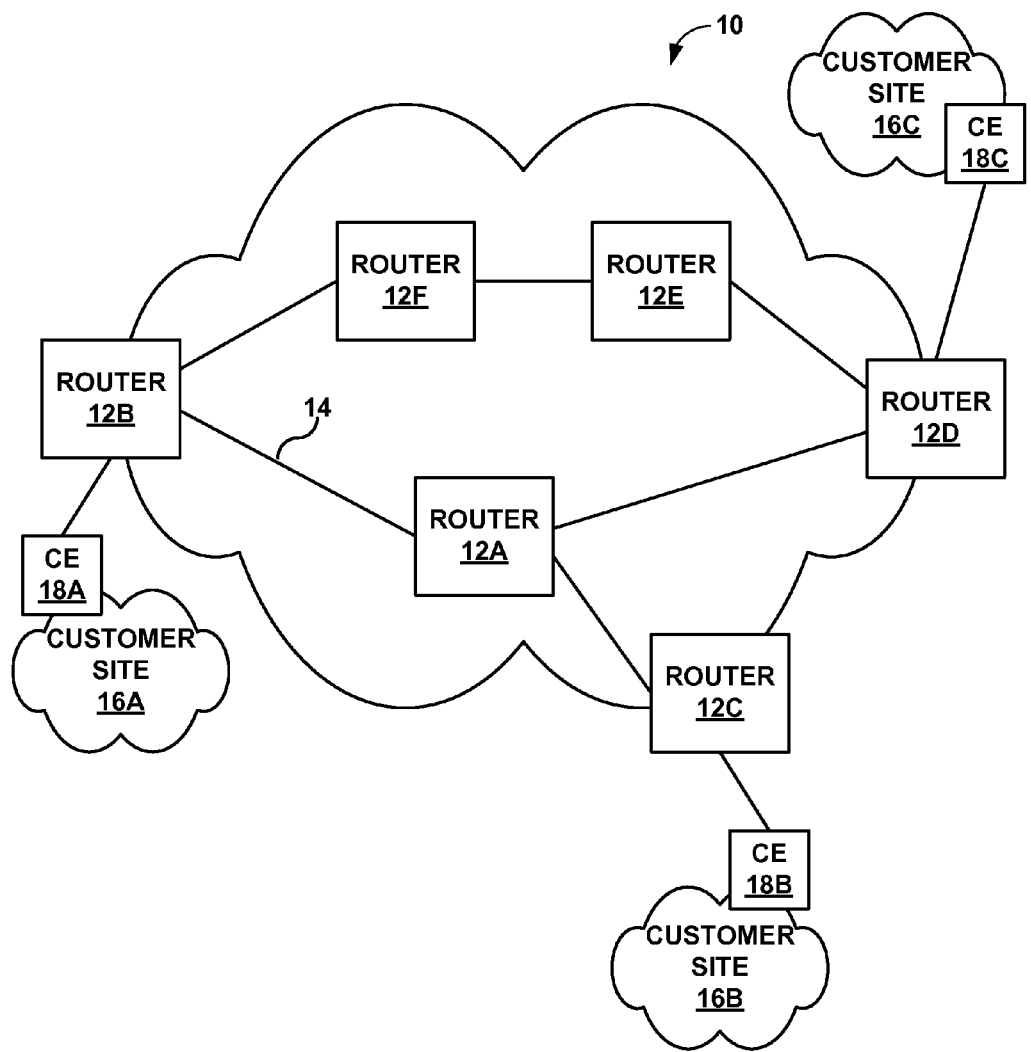
FIG. 1 is a block diagram illustrating an example computer network comprising one or more routers configured to run a first virtual machine to control routing functionality and a second virtual machine to provide high availability for the router.

FIG. 1 is a block diagram illustrating an example computer network 10 comprising one or more routers 12A-12F ("routers 12") configured to run a primary virtual machine to control routing functionality and a standby virtual machine to provide high availability for the router. Routers 12 exchange routing information with each other to maintain an updated view of the topology of network 10. In the case where one of routers 12 fails, packet forwarding to customer networks 16A-16C ("customer networks 16") may be disrupted while routing information is updated across network 10 to establish routes around the failed one of routers 12. To avoid this disruption, the techniques of this disclosure provide high availability using full memory replication for one or more of routers 12 configured to run a primary virtual machine and a standby virtual machine on the router.

Computer network 10 may comprise the Internet or another public network. In some cases, network 10 may comprise a multi-protocol label switching (MPLS) network. In the illustrated example, network 10 includes routers 12, some of which may comprise edge routers (e.g., router 12B, 12C and 12D) and some of which may comprise core network routers (e.g., router 12A, 12E and 12F). Each of the edge routers 12B, 12C, and 12D couples to one or more remote customer sites 16A-16C ("customer sites 16") via customer edge (CE) routers 18A-18C ("CE routers 18"). For example, router 12B is coupled to customer site 16A via CE router 18A, router 12C is coupled to customer site 16B via CE router 18B, and router 12D is coupled to customer site 16C via CE router 18C.

Each of customer sites 16 may include a local area network (LAN) or a wide area network (WAN) that comprises a plurality of subscriber devices, such as desktop computers, laptops, workstations, PDAs, wireless devices, network-ready appliances, file servers, print servers or other devices. In some cases, one or more of customer sites 16 may be connected in a customer network across computer network 10 to enable customer sites 16 to securely share data over network 10. For example, the customer network may comprise a separate multicast service instance, such as a multicast virtual private network (MVPN) or a virtual private LAN service (VPLS).

In the illustrated example of FIG. 1, routers 12 are connected to each other via network links, such as link 14 between router 12A and router 12B. In some cases, one or more routers 12 may establish a label switched path (LSP) within network 10 that connects all of routers 12 to one each other. Each of routers 12 includes at least one routing engine that maintains routing information describing the routes or paths through network 10. A routing engine within one of routers 12 may utilize a virtual machine executing within an operating environment of a hypervisor, instead of running directly on top of the hardware, to control routing functionality of the router. This makes it possible for multiple instances of operating systems to run simultaneously on a single routing engine. In some cases, router 12 may exchange routing information with each other according to a defined routing protocol, such as the Border Gateway Protocol (BGP).

From the routing information, each of routers 12 generates forwarding information used to relay packets through network 10. Upon receiving an incoming packet, router 12A, for example, examines information within the packet to identify the destination for the packet, and then forwards the packet toward the destination in accordance with the forwarding information. As an example, router 12A may receive a packet from router 12C, and based on routing information maintained by router 12A, forwards the packet to a neighboring router, such as router 12B, over network link 14.

In some cases, one of routers 12 may fail due to a failure of either the software system of a primary virtual machine running on a routing engine of the router or the underlying hardware of the routing engine. In order to avoid a total failure of the router, a standby virtual machine may be used to provide high availability for the router during operation of the routing functionality by the primary virtual machine. As one example, one or more of routers 12 may include a single routing engine on which both the primary virtual machine and the standby virtual machine may run. In this case, the standby virtual machine may protect the router from software errors on the primary virtual machine. As another example, one or more of router 12 may include dual routing engines such that the primary virtual machine may run on a first routing engine and the standby virtual machine may run on the second routing engine. In this case, the standby virtual machine on the second routing engine may protect the router from software errors on the primary virtual machine and from hardware failure of the first routing engine.

In either case, the high availability of the router enables a graceful restart, e.g., graceful routing engine switchover (GRES), from the primary virtual machine to the standby virtual machine if the primary virtual machine fails. Conventionally, the graceful restart requires replicating multiple different kernel states from the primary virtual machine to the standby virtual machine, which requires knowledge of the kernel objects and their implementation via an operating system kernel. This intricate kernel state replication process may be difficult to maintain and is inherently error-prone. Each type of kernel state, e.g., routes, next hops, interfaces, and the like, needs be maintained and replicated separately. If a new type of kernel state is introduced, kernel state replication implementation changes may need to be made manually.

When a new feature is developed, additional development may be needed to support graceful restart for the new feature.

The techniques described in this disclosure provide high availability for at least one of routers 12, e.g., router 12A, by using full memory replication between a primary virtual machine and a standby virtual machine running on router 12A. The primary virtual machine controls the routing functionality of router 12A and periodically stores a full memory state of the primary virtual machine. Upon a failure of the primary virtual machine, the hypervisor executing the virtual machines may perform a full memory replication between the primary virtual machine and the standby virtual machine. For example, the full memory replication may be performed by merging the stored full memory state into the standby virtual machine. The hypervisor may then perform a graceful restart for the standby virtual machine to take control of the routing functionality of router 12A at the last stored state of the memory of the primary virtual machine.

In one example, the techniques provide hot-standby high availability for router 12A by initializing a primary virtual machine and a standby virtual machine on router 12A at the same time. In this case, the standby virtual machine may take control of the routing functionality immediately upon a failure of the primary virtual machine because no additional time is required to initialize a new virtual machine instance. In another example, the techniques provide high availability for router 12A by initializing a standby virtual machine on router 12A only upon detecting a failure of the primary virtual machine. In this case, once a new virtual machine is initialized, the standby virtual machine may take control of the router functionality. The techniques further include either initializing the standby virtual machine on the same routing engine of router 12A as the primary virtual machine, or initializing the standby virtual machine on a separate routing engine of router 12A than the primary virtual machine.

The techniques are typically described in this disclosure with respect to routers, but the techniques may also be applied to network devices other than routers. The primary virtual machine on router 12A may control the high availability process described in this disclosure. For example, the primary virtual machine may operate as a master virtual machine and the standby virtual machine may operate as a slave virtual machine that synchronizes with the primary virtual machine. In another example, a management virtual machine may be initialized on router 12A in order to control the high availability process described in this disclosure.

The graceful restart from the primary virtual machine to the standby virtual machine may be implemented by router 12A to minimize the effect the switchover has on network 10. For example, during the switchover from the primary virtual machine to the standby virtual machine, router 12A continues to receive packets from other routers, such as router 12C, and based on routing information maintained by router 12A, continues forwarding the packets to neighboring routers, such as router 12B over link 14. Further details of graceful restart are described in U.S. Pat. No. 7,359,377, issued Apr. 15, 2008, the entire contents of which are incorporated by reference herein.

According to the techniques, upon a failure of the primary virtual machine, the hypervisor may perform a graceful restart to the standby virtual machine by performing a full memory replication of the primary virtual machine to the standby virtual machine, instead of replicating multiple different kernel states, which requires knowledge of the kernel objects and their implementation via an operating system kernel. The full memory state of the primary virtual machine may include, for example, one or more memory pages of all kernel states of the operating system kernel executing on the primary virtual machine, an executable software image of the primary virtual machine including a software system executed by the primary virtual machine, and link states of the primary virtual machine. The link states may comprise states of physical links, e.g., link 14, between routers 12 that define a network topology of network 10. Regardless of implementation changes between different releases of software systems, the network topology of network 10 and the link states of the links between routers 12 that make up the network topology do not change. Upon replicating the link states of the primary virtual machine, the standby virtual machine may translate the link states into kernel objects for whatever software system is executed by the standby virtual machine.

The techniques for providing high availability using full memory replication enable a simplified process of blindly replicating a state of the memory that does not require knowledge of the features and kernel states stored in the memory or their implementation via the operating system kernel or processes executing thereon. For example, high availability with full memory replication does not require individual kernel states to be maintained and replicated separately, or manual kernel state replication implementation changes. The techniques may also reduce development time and cost because feature development would no longer be tied to high availability and graceful restart support. In addition, the techniques may eliminate the need to perform non-stop forwarding during a switchover because the standby virtual machine may take over control of the routing functionality at the exact memory state stored by the primary virtual machine before failure.

The techniques may also eliminate the need to check that both virtual machines are running the same software system before performing a high availability switchover. For example, when the full memory replication includes replicating an image of the primary virtual machine including a software system executed by the primary virtual machine to the standby virtual machine, the software system executed by the standby virtual machine will no doubt be the same as that executed by the primary virtual machine. As another example, when the full memory replication includes replicating link states of the primary virtual machine to the standby virtual machine, the standby virtual machine may translate the link states into kernel objects for whatever software system is executed by the standby virtual machine. In this case, the primary virtual machine and the standby virtual machine may execute different software systems with different kernel state implementations and still support high availability.

Figure 2:
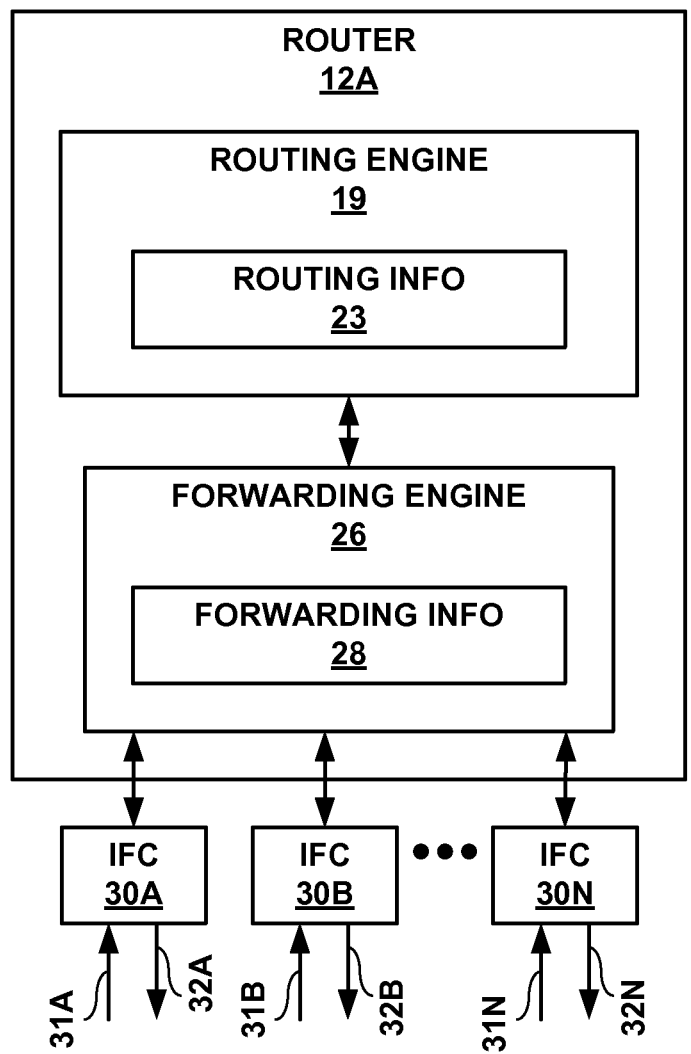
FIG. 2 is a block diagram illustrating functional components of a router configured to run a primary virtual machine to control routing functionality and a standby virtual machine to provide high availability for the router.

FIG. 2 is a block diagram illustrating functional components of a router 12A configured to run a primary virtual machine to control routing functionality and a standby virtual machine to provide high availability for router 12A. Router 12A may operate substantially similar to one of router 12A in computer network 10 from FIG. 1. Router 12A comprises a routing engine 19, a forwarding engine 26, and interface network cards (IFCs) 30A-30N ("IFCs 30"). Routing engine 19 and forwarding engine 26 receive and send information to a network, e.g., computer network 10, through IFCs 30 via inbound communication links 31A-31B ("inbound links 31") and outbound communication links 32A-32N ("outbound links 32"). In the example illustrated in FIG. 2, router 12A includes a single physical routing engine 19. In other examples, router 12A may include two or more physical routing engines.

Routing engine 19 implements one or more routing protocols to perform a variety of functions, such as to exchange routing information, to establish VPNs or LSPs, and for exchanging labels. For example, routing engine 19 implements one of protocols 48A to establish at least one routing communication session with neighboring routers, e.g., routers 12, in network 10 in order to exchange routing information. Based on the learned routing information, routing engine 19 maintains and updates routing information 23 to describe a topology of the network, and more particularly, routes through the network.

Routing engine 19 analyzes its stored routing information 23 and generates forwarding information 28 for forwarding engine 26. Routing engine 19 typically processes routing information 23 to perform route selection and generate forwarding information 28 based on the selected routes. In this way, routes as well as labeling information may be stored into forwarding engine 26. Forwarding information 28 may associate, for example, network destinations with specific next hops. Routing engine 19 may generate forwarding information 28 in the form of a radix tree having leaf nodes that represent destinations within network 10. When forwarding a packet, forwarding engine 26 traverses the radix tree to a leaf node based on information within a header of the packet to ultimately select a next hop and output interface to which to forward the packet. Forwarding engine 26 then forwards the packet via the selected one of outbound links 32 of IFCs 30.

Further details of one example embodiment of a router can be found in U.S. patent application Ser. No. 12/182,619, filed Jul. 30, 2008, entitled "STREAMLINED PACKET FORWARDING USING DYNAMIC FILTERS FOR ROUTING AND SECURITY IN A SHARED FORWARDING PLANE," which is incorporated herein by reference.

Figure 3A:
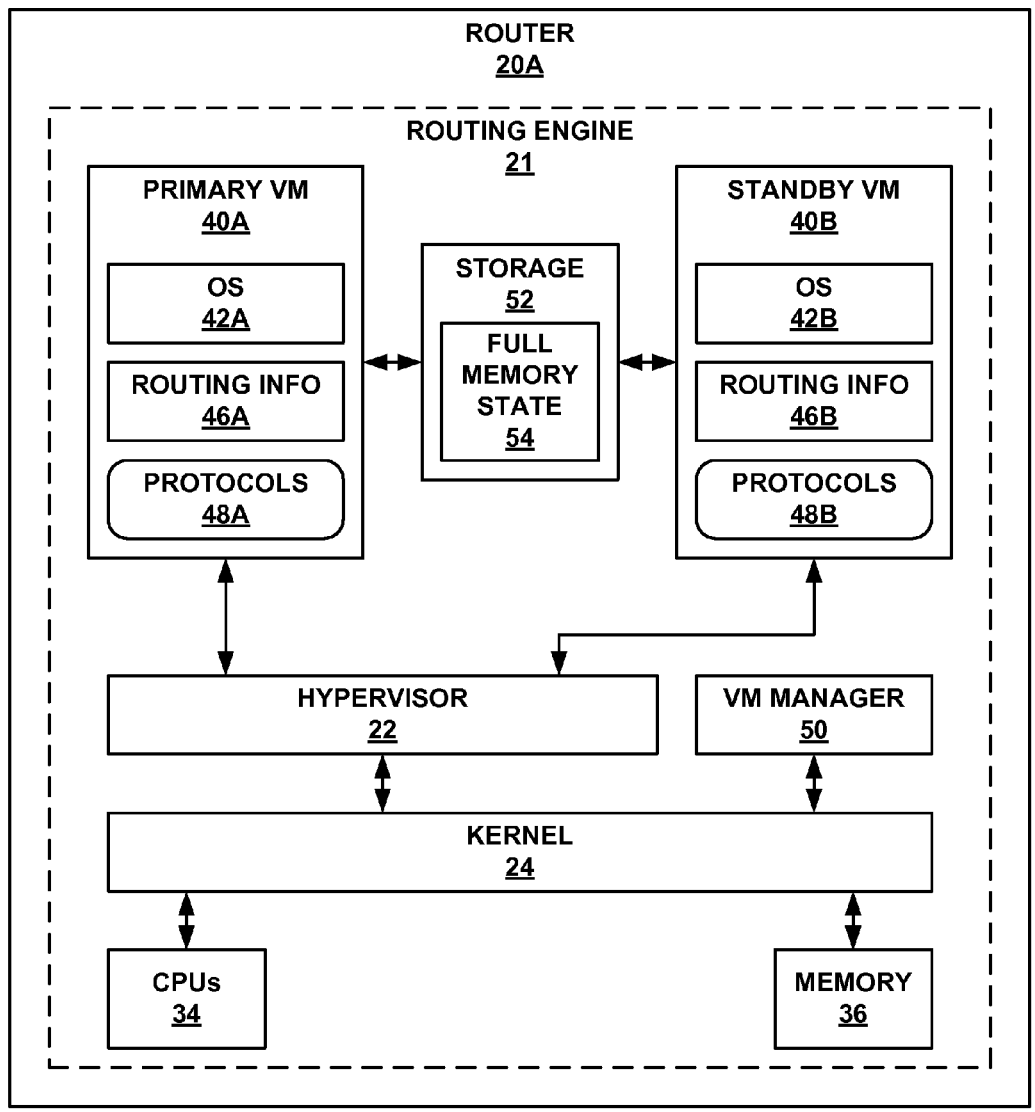
FIGS. 3A-3B are logical diagrams illustrating various software processes executed on hardware components of a single physical routing engine of a router at different stages of a failover with high availability using full memory replication.
Figure 3B:
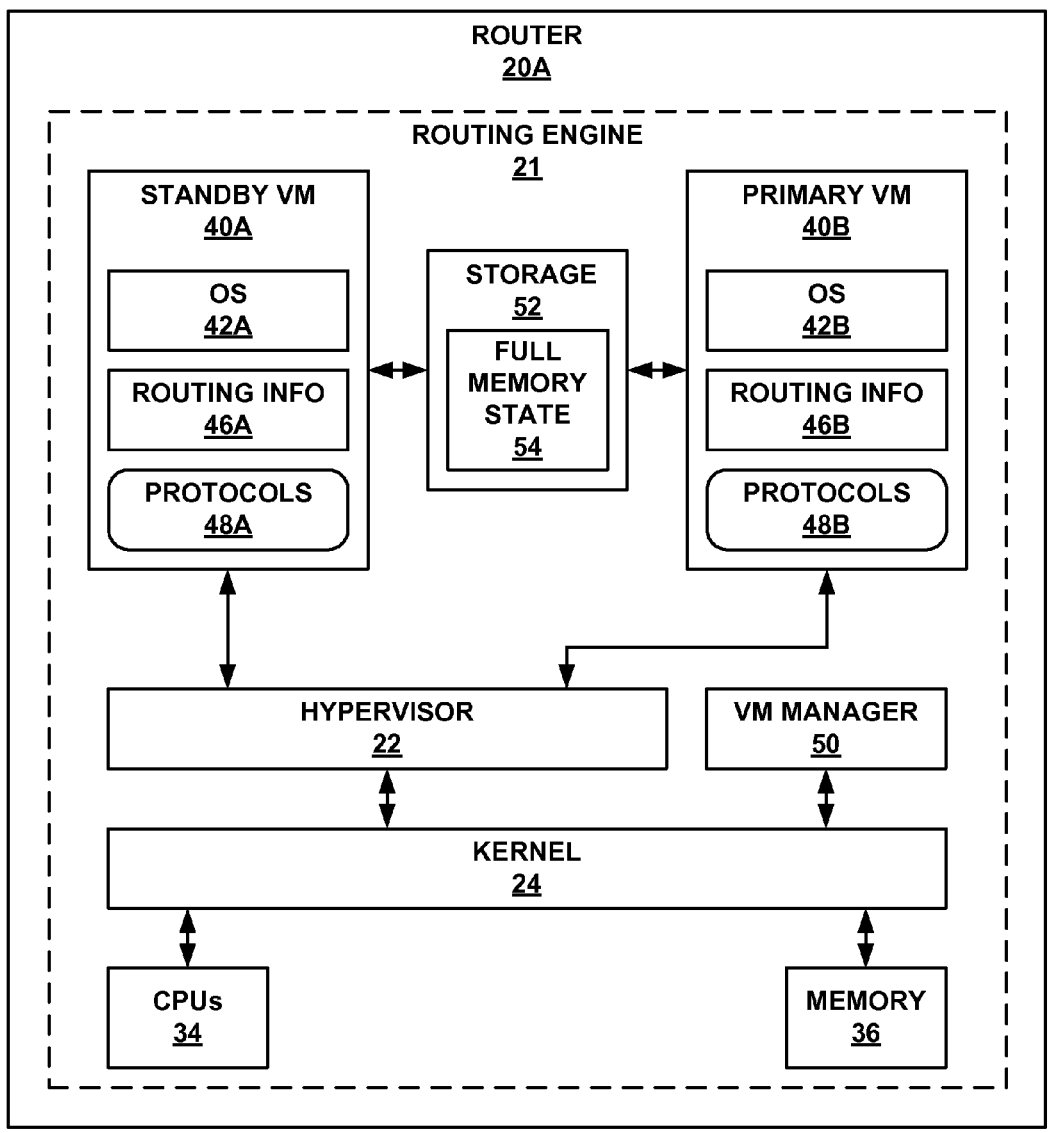

FIGS. 3A-3B are logical diagrams illustrating various software processes executed on hardware components of a single physical routing engine 21 of a router 20A at different stages of a failover with high availability using full memory replication. Router 20A may operate substantially similar to one of routers 12, e.g., router 12A, in computer network 10 from FIG. 1. In this example, router 20A comprises a single physical routing engine 21. The single hardware platform of single physical routing engine 21 includes a hypervisor 22, a VM manager 50, an operating system kernel 24, one or more central processing units (CPUs) 34, and a memory 36.

CPUs 34 of router 20A are configured to execute instructions stored in memory 32. Memory 32 may comprise one or more computer-readable media, such as a non-transitory, computer-readable storage media. Examples of such media include RAM, ROM, NVRAM, EEPROM, flash memory, and other computer-readable storage media. Kernel 24 manages the physical resources of the router 20A, including CPUs 34, memory 36, forwarding engine 26, IFCs 30, and any additional hardware. Through hypervisor 22 running on top of kernel 24, router 20A has the capability to concurrently run a plurality of virtual machines, each with its own unique operating system, on routing engine 21. Hypervisor 22 may, for example, be a proprietary program such as VMWARE® or an open source solution. Hypervisor 22 executes on the single hardware platform of routing engine 21 to provide an operating environment for one or more virtual machines on router 20A.

The techniques described in this disclosure provide high availability using full memory replication on single physical routing engine 21 of router 20A by executing a pair of virtual machines within the operating environment provided by hypervisor 22 on routing engine 21. FIG. 3A illustrates routing engine 21 with primary virtual machine (VM) 40A and standby VM 40B. Each of primary VM 40A and standby VM 40B operate as stand-alone virtual routing engines for router 20A. Standby VM 40B may provide high availability using full memory replication to router 20A by enabling a graceful restart from primary VM 40A to the standby VM 40B in the event of a failure of primary VM 40A. For example, upon detecting a failure of primary VM 40A, hypervisor 22 may replicate full memory state 54 of primary VM 40A to standby VM 40B and switch control of the routing functionality for router 20A from primary VM 40A to standby VM 40B. Standby VM 40B may provide high availability for router 20A using either a hot-standby approach or a cold-standby approach.

In an example of the hot-standby approach, primary VM 40A and standby VM 40B may be initialized on routing engine 21 at the same time. In this case, standby VM 40B provides hot-standby high availability to router 20A by being ready and available to take control of the routing functionality of router 20A if primary VM 40A fails. The hot-standby approach to high availability enables standby VM 40B to take control immediately upon a failure of primary VM 40A because no additional time is required to initialize a new virtual machine instance. Both primary VM 40A and standby VM 40B running on single routing engine 21 may present the same Internet Protocol (IP) address and Media Access Control (MAC) address when communicating with neighboring routers over a network. Standby VM 40B, therefore, must remain silent during operation of the routing session for router 20A by primary VM 40A.

In an example of the cold-standby approach, standby VM 40B may be initialized on routing engine 21 only upon detecting a failure of primary VM 40A. In this case, standby VM 40B provides high availability to router 20A, upon detecting a failure of primary VM 40A, by first being initialized on routing engine 21 and then taking control of the routing functionality of router 20A. The cold-standby approach to high availability enables standby VM 40B to be brought into service and take control upon a failure of primary VM 40A while only having to maintain a single virtual machine instances on routing engine 21 during normal operation.

Regardless of when standby VM 40B is initialized, primary VM 40A and standby VM 40B may have a master/slave relationship. For example, primary VM 40A may be designated as the master virtual machine for router 20A by its configuration upon start-up on routing engine 21 by hypervisor 22. Similarly, standby VM 40B may be designated as the slave virtual machine for router 20A by its configuration upon start-up on routing engine 21 by hypervisor 22.

In the example of FIG. 3A, primary VM 40A executes a first operating system (OS) 42A, such as a version of a network operating system. Standby VM 40B executes an OS 42B, which may be an instance of the same operating system executed by primary VM 40A. As the slave virtual machine, standby VM 40B may continually synchronize with primary VM 40A. In the illustrated example of FIG. 3A, standby VM 40B may synchronize with primary VM 40A via a storage 52 to update routing information 46B and protocols 48B based on routing information 46A and protocols 48A from primary VM 40A. Standby VM 40B may also synchronize with primary VM 40A via storage 52 to replicate state information in the form of a full memory state 54.

As the master virtual machine for router 20A, primary VM 40A controls routing functionality and other functions on behalf of router 20A. Primary VM 40A implements one or more routing protocols 48A. Protocols 48A may include, for example, routing protocols, tunneling protocols, and label switching protocols, such as BGP, IS-IS, RSVP-TE and LDP, or other protocols. Primary VM 40A uses protocols 48A to exchange routing information with neighboring routers in a network, e.g., routers 12 in network 10. Based on the learned routing information, primary VM 40A maintains and updates routing information 46A to describe a topology of the network, and more particularly, routes through the network.

Router 20A includes VM manager 50 to control a high availability graceful restart, including full memory replication and virtual machine switchover, for router 20A. In the illustrated example, VM manager 50 operates on top of kernel 24, effectively alongside hypervisor 22, to oversee the operation of primary VM 40A and standby VM 40B. In other examples, router 20A may include a management virtual machine to control the high availability process. According to the techniques of this disclosure, during normal operation, VM manager 50 may periodically store a state of the entire memory of primary VM 40A, i.e., full memory state 54, in storage 52 via hypervisor 22. The stored full memory state 54 may include, for example, one or more memory pages of all kernel states of OS 42A executing on primary VM 40A, an executable software image of primary VM 40A including a software system executed by primary VM 40A, and/or link states of primary VM 40A that comprise states of physical links between routers that define a network topology of a network. In this way, VM manager 50 may blindly store a current state of the entire memory, and does not need to store individual kernel states, including states of routes, next hops, interfaces, and the like. Storing each different kernel state may require knowledge of the kernel objects and their implementations via kernel 24 or processes executing thereon.

In the example illustrated in FIG. 3A, VM manager 50 may periodically checkpoint full memory state 54 of primary VM 40A in storage 52, which is shared with standby VM 40B. Checkpointing enables the memory of primary VM 40A and the memory of standby VM 40B to periodically synchronize such that both virtual machines have the same memory. In one example, standby VM 40B may synchronize with memory pages of primary VM 40A to replicate full memory state 54 in storage 52 asynchronously with the periodic checkpointing of full memory state 54 from primary VM 40A.

Full memory state 54 may be checkpointed periodically according to a given interval of time. The time interval may be configurable based on a size of the memory of primary VM 40A to be stored and an overhead limit for router 20A. In some cases, only the first checkpoint of full memory state 54 needs to store a state of the entire memory of primary VM 40A. Subsequent checkpointing may only store incremental changes to the memory of primary VM 40A to capture the differences between two points in time.

Before, during, and after a graceful restart, VM manager 50 may use keep-alive or heartbeat mechanisms to monitor the health of primary VM 40A. More specifically, the heartbeat mechanisms may detect a failure of primary VM 40A. If a failure is detected on primary VM 40A, VM manager 50 may request hypervisor 22 to instigate a full memory replication from primary VM 40A to standby VM 40B via storage 52.

The full memory replication may include replicating full memory state 54 at the last checkpoint stored in storage 52 and merging the replicated memory state into standby VM 40B. In the case of a hot-standby high availability process, standby VM 40B is already in service on routing engine 21 at the time of the failure. Full memory state 54 may be replicated and merged into standby VM 40B for standby VM 40B to immediately take control of the routing session for router 20A. In the case of a cold-standby high availability process, hypervisor 22 first initializes standby VM 40B upon detecting the failure. Once standby VM 40B is running on routing engine 21, full memory state 54 may be replicated and merged into standby VM 40B for standby VM 40B to take control of the routing session for router 20A.

Replicating stored full memory state 54 instead of individual kernel states into standby VM 40B does not require knowledge of the features and kernel states stored in the memory of primary VM 40A or the implementation of the features and kernel states via kernel 24 or processes executing thereon. Instead, VM manager 50 may blindly replicate full memory state 54 into standby VM 40B, which may include a memory page of all kernel states of OS 42A on primary VM 40A, an executable software image of primary VM 40A including a software system executed by primary VM 40A, and/or link states of primary VM 40A that comprise states of physical links between routers within a network that standby VM 40B may translate into kernel objects for whatever software system is executed by standby VM 40B.

High availability with full memory replication as described in this disclosure does not require individual kernel states to be maintained and replicated separately, or manual kernel state replication implementation changes. The creation and change of any of the multiple different kernel objects in primary VM 40A results in a memory change. Instead of replicating each kernel object individually, therefore, the changed memory page may be replicated without knowledge of the details of the information and semantics that the memory page holds. The use of full memory replication may also reduce development time and cost because feature development is not tied to high availability graceful restart support. In addition, the fully memory replication operation may be performed via hypervisor 22 upon request by VM manager 50. In this way, OS 42A of primary VM 40A and OS 42B of standby VM 40B may be unaware of the full memory replication operation. The techniques, therefore, enable routing engine 21 to provide high availability support for router 20A in a black box way.

The techniques may also eliminate the need to check that both virtual machines are running the same software system before performing a high availability switchover. Conventionally, in order to perform a graceful restart, a primary virtual machine and a standby virtual machine must be running the same software system. According to the techniques, full memory replication may include replicating an image of primary VM 40A including OS 42A executed by primary VM 40A to standby VM 40B. In this way, after the full memory replication, OS 42B executed by standby VM 40B will no doubt be the same as OS 42A executed by primary VM 40A.

In addition, full memory replication may include replicating link states of primary VM 40A to standby VM 40B. The link states may comprise states of physical links between routers that define a network topology of a network, e.g., the links between routers 12 in network 10. Regardless of implementation changes between different releases of software systems, the network topology and the link states of the links between the routers that make up the network topology do not change. Standby VM 40B may then translate the link states into kernel objects for whatever software system, i.e., OS 42B, is executed by standby VM 40B. Replicating the link states, instead of individual kernel objects that depend on specific implementations, may enable a newer software system, e.g., OS 42B of standby VM 40B, to generate appropriate kernel objects from the link states of an older software system, e.g., OS 42A of primary VM 40A. In this case, primary VM 40A and standby VM 40B may execute different software systems with different kernel state implementations and still support high availability.

Once full memory state 54 is replicated and merged into standby VM 40B via hypervisor 22, standby VM 40B may take control of the routing session for router 20A. More specifically, VM manager 50 may request hypervisor 22 to switch control of the routing functionality for router 20A from primary VM 40A to standby VM 40B.

FIG. 3B illustrates routing engine 21 with new primary VM 40B and new standby VM 40A after the switchover. The titles of the virtual machines on routing engine 21 illustrated in FIG. 3B have been changed to reflect the new primary VM 40B and the new standby VM 40A. After the switchover, primary VM 40B may be run on routing engine 21 to control the routing functionality and other functions of router 20A starting at full memory state 54 of the last checkpoint in storage 52. By starting operation at the exact state of the last checkpoint of the memory of failed VM 40A, router 20A may not need to perform additional features, such as non-stop forwarding, for new primary VM 40B to "catch-up" to the last state of the failed VM 40A.

VM manager 50 may then request hypervisor 22 to terminate standby VM 40A. In the case of a cold-standby high availability process, a new standby VM 40A may only be re-initialized by hypervisor 22 upon detecting a failure of primary VM 40B. In the case of a hot-standby high availability process, VM manager 50 may request hypervisor 22 to immediately re-initialize standby VM 40A on routing engine 21. Standby VM 40A may provide hot-standby high availability for router 20A during operation of the routing session by primary VM 40B. In some cases, instead of terminating standby VM 40A, VM manager 50 may place standby VM 40A into a suspended state during which an operator may perform diagnostics to determine a cause of the failure. When the diagnostic testing is complete, VM manager 50 may then terminate standby 40A and, in the case of hot-standby, re-initialize a new instance of standby VM 40A on routing engine 21.

After the switchover is complete, VM manager 50 on primary VM 40B may begin periodically storing a state of the entire memory of primary VM 40B, i.e., full memory state 54, in storage 52 via hypervisor 22. VM manager 50 may store or checkpoint full memory state 54 in substantially the same manner as described above with respect to primary VM 40A of FIG. 3A. VM manager 50 may also use keep-alive or heartbeat mechanisms to monitor the health of primary VM 40B. If a failure is detected on primary VM 40B, VM manager 50 may request hypervisor 22 to instigate a full memory replication from primary VM 40B to standby VM 40A via storage 52.

In general, providing high availability within a single routing engine, e.g., routing engine 21, using a virtual machine switchover may be less disruptive than switching between two separate routing engines. In addition, as described above, both primary VM 40A and standby VM 40B running on single routing engine 21 may present the same IP address and MAC address when communicating with neighboring routers over a network. Specifically, the intra-routing engine virtual machine switchover may be less disruptive from the perspective of distributed packet forwarding devices, e.g., IFCs 30, because there is no switchover of the routing engine. In the case of an intra-routing engine virtual machine switchover, the distributed packet forwarding devices observe no change and control over the routing session may pass cleanly from primary VM 40A to standby VM 40B.

Router 20A may also reduce the impact of switching control of the routing session from primary VM 40A to standby VM 40B by supporting "non-stop forwarding" and "graceful restart." Non-stop forwarding refers to the ability of forwarding engine 26 to continue forwarding packets while router 20A simultaneously reestablishes a routing session. Graceful restart or GRES refers to the capability of preserving forwarding information while restarting a routing communication session, e.g., a BGP session. In some cases, the techniques for high availability with full memory replication may eliminate the need to perform non-stop forwarding during a switchover because standby VM 40B may take over control of the routing functionality for router 20A at the exact full memory state 54 stored by primary VM 40A before failure. When establishing a routing communication session, router 20A may advertise its capabilities to neighboring routers in a network, including a restart time. The restart time reflects the estimated amount of time that it will take for router 20A to reestablish the routing communication session after failure of the previous session, e.g., approximately 120 seconds.

Primary VM 40A may periodically store or checkpoint full memory state 54, which is replicated to standby VM 40B. During a switchover, the stored full memory state 54 enables router 20A to continue forwarding packets over routes that were available in the last-known state of the network. During the switchover, hypervisor 22 may manage communication and control for distributed packet forwarding devices, e.g., IFCs 30, within router 20A according to the last-known state maintained by primary VM 40A. Concurrently during the switchover, standby VM 40B may learn the network topology by receiving routing protocol updates from neighboring routers in the network and calculate its routing information and forwarding information. After the switchover, standby VM 40B may assume control of the forwarding process according to the last-known state replicated from full memory state 54 or according to a more recently learned state from the routing protocol updates. As a result, impact on current packet flows through the network during a switchover may be reduced.

Upon failure of the routing communication session, which may be caused by the switchover from primary VM 40A to standby VM 40B, other routers in the network may preserve forwarding information for router 20A based on the expectation that failed router 20A will reestablish the routing communication session shortly. Similarly, failed router 20A may preserve a state of forwarding information 28, e.g., full memory state 54, that existed prior to the failure within primary VM 40A. Consequently, the neighboring routers do not need to find alternative routes unless failed router 20A does not reestablish the routing communication session within the advertised restart time. As a result, routing instability caused by routing flaps within the network (i.e., routers advertising a destination on a network as being unavailable, and shortly thereafter, advertising the destination as available again) may be reduced.

Figure 4A:
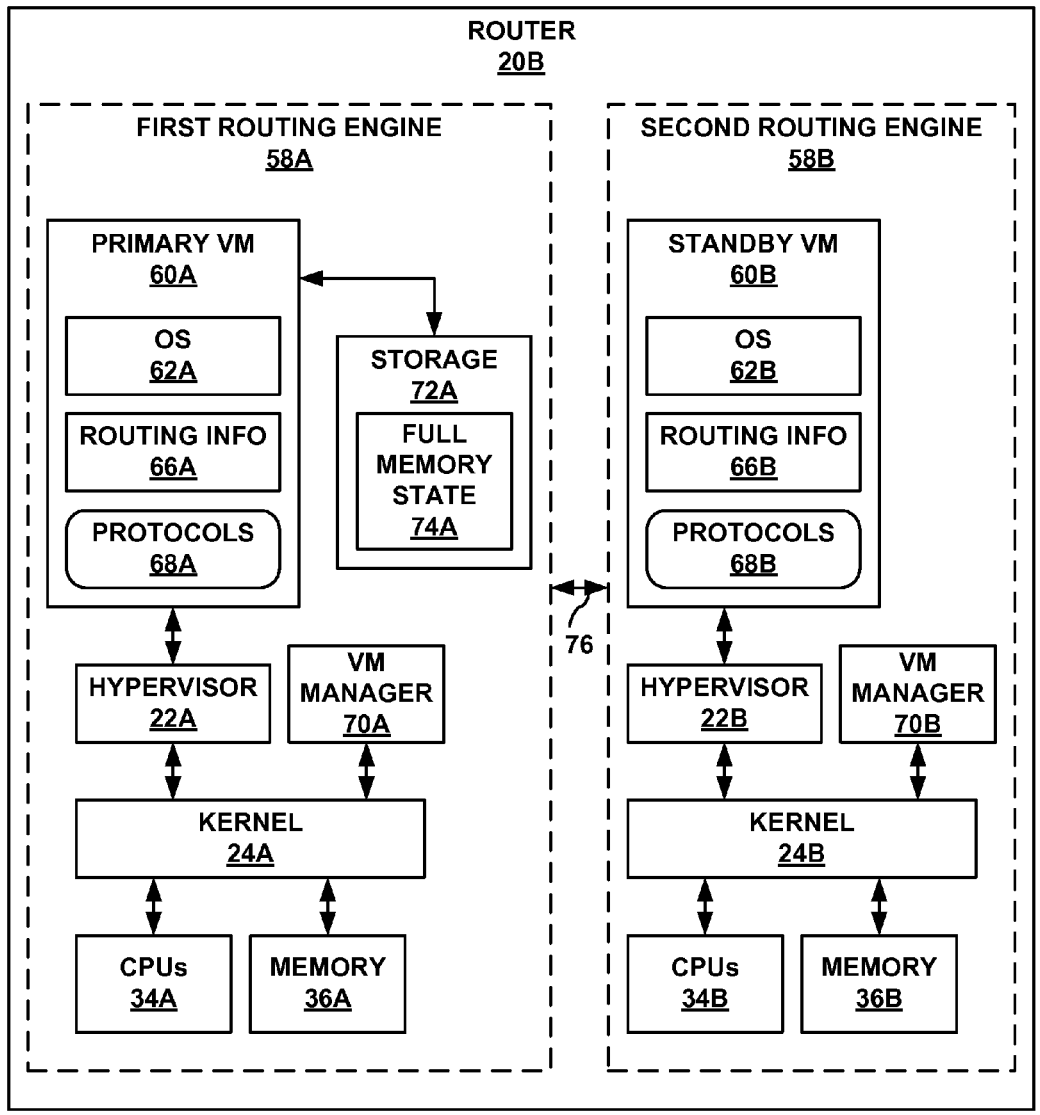
FIGS. 4A-4B are logical diagrams illustrating various software processes executed on hardware components of dual physical routing engines of a router at different stages of a failover with high availability using full memory replication.
Figure 4B:
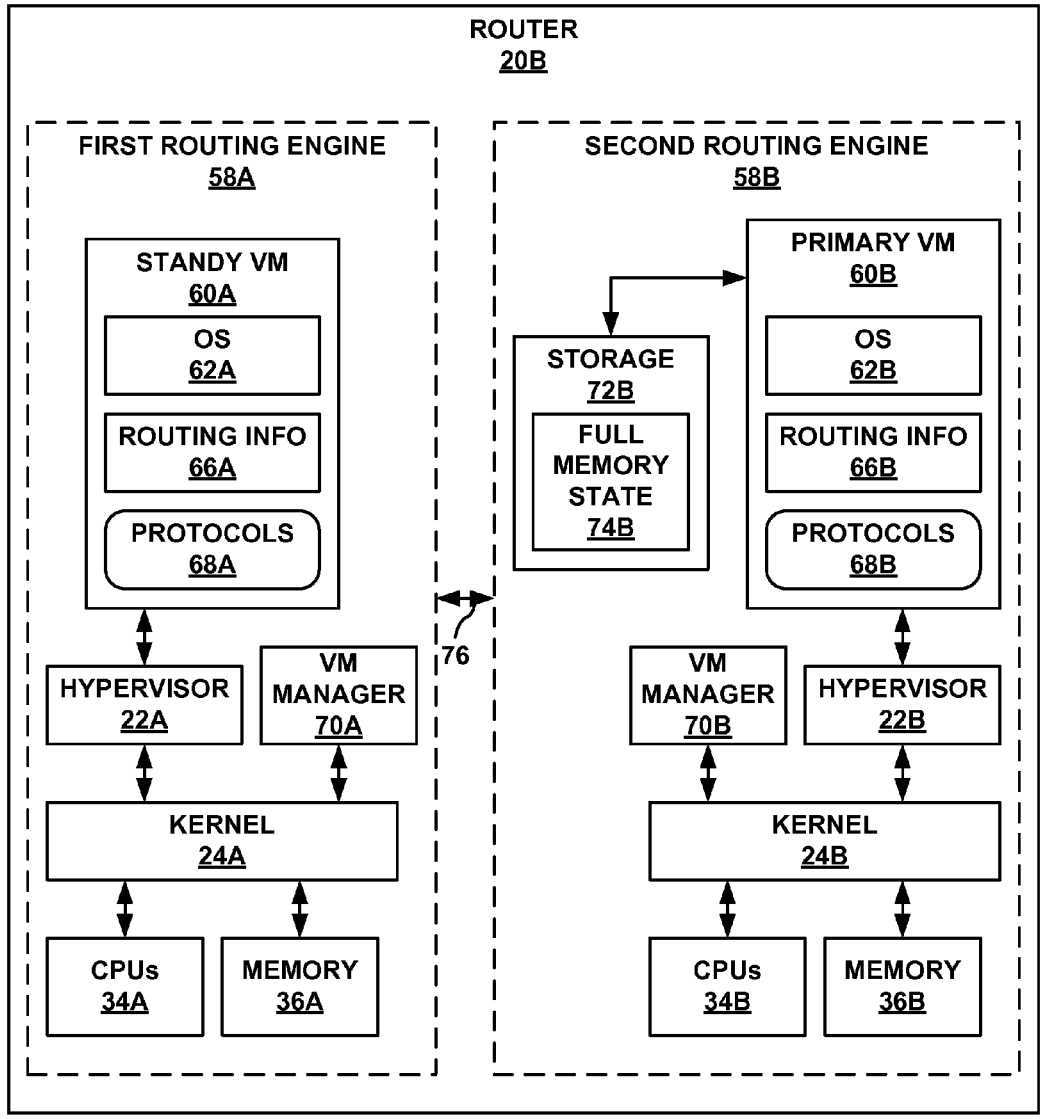

FIGS. 4A-4B are logical diagrams illustrating various software processes executed on hardware components of dual routing engines, first routing engine 58A and second routing engine 58B, of a router 20B at different stages of a failover with high availability using full memory replication. Router 20B may operate substantially similar to one of routers 12, e.g., router 12A, in computer network 10 from FIG. 1. Router 20B may also operate substantially similar to router 20A from FIGS. 3A-3B. In this example, router 20B comprises first physical routing engine 58A and second physical routing engine 58B. The hardware platform of first routing engine 58A includes a hypervisor 22A, a VM manager 70A, a kernel 24A, one or more CPUs 34A, and a memory 36A. The hardware platform of second routing engine 58B includes a hypervisor 22B, a VM manager 70B, a kernel 24B, one or more CPUs 34B, and a memory 36B. Hypervisor 22A executes on the platform of first physical routing engine 58A to provide an operating environment for one or more virtual machines on first routing engine 58A, and hypervisor 22B executes on the platform of second physical routing engine 58B to provide an operating environment for one or more virtual machines on second routing engine 58B. Hypervisors 22A-22B, kernels 24A-24B, CPUs 34A-34B, and memories 36A-36B may be constructed and operate as described above with respect to hypervisor 22, kernel 24, CPUs 34, and memory 36 of FIG. 3A. In addition, primary VM 60A may operate substantially similar to primary VM 60A from FIG. 3A, and standby VM 60B may operate substantially similar to standby VM 40B from FIG. 3A.

The techniques described in this disclosure provide high availability using full memory replication on dual routing engines 58A-B of router 20B by running at least one virtual machine on each of physical routing engines 58A-B. FIG. 4A illustrates first physical routing engine 58A with primary VM 60A and second physical routing engine 58B with standby VM 60B. Each of primary VM 60A of first physical routing engine 58A and standby VM 60B of second physical routing engine 58A operate as stand-alone virtual routing engines for router 20B. Standby VM 60B may provide high availability using full memory replication to router 20B by enabling a graceful restart from primary VM 60A to the standby VM 60B in the event of a failure of primary VM 60A. For example, upon detecting a failure of primary VM 60A, hypervisor 22A may communicate with hypervisor 22B to replicate full memory state 74A of primary VM 60A to standby VM 60B and switch control of the routing functionality for router 20B from primary VM 60A to standby VM 60B. Standby VM 60B may provide high availability for router 20B using either a hot-standby approach or a cold-standby approach.

In an example of the hot-standby approach, primary VM 60A and standby VM 60B may be initialized on respective routing engines 58A-58B at the same time. In this case, standby VM 60B provides hot-standby high availability to router 20B by being ready and available to take control of the routing functionality of router 20B if primary VM 60A fails. The hot-standby approach to high availability enables standby VM 60B to take control immediately upon a failure of primary VM 60A because no additional time is required to initialize a new virtual machine instance on second routing engine 58B.

In an example of the cold-standby approach, standby VM 60B may be initialized on second routing engine 58B only upon detecting a failure of primary VM 60A on first routing engine 58A. In this case, standby VM 60B provides high availability to router 20B, upon detecting a failure of primary VM 60A, by first being initialized on second routing engine 58B and then taking control of the routing functionality of router 20B. The cold-standby approach to high availability enables standby VM 60B to be brought into service and take control upon a failure of primary VM 60A while only having to maintain a single virtual machine instance on a single routing engine during normal operation.

Regardless of when standby VM 60B is initialized, primary VM 60A and standby VM 60B may have a master/slave relationship. For example, primary VM 60A may be designated as the master virtual machine for router 20B by its configuration upon start-up on first routing engine 58A by hypervisor 22A. As the master virtual machine for router 20B, primary VM 60A controls routing functionality and other functions on behalf of router 20B. Similarly, standby VM 60B may be designated as the slave virtual machine for router 20B by its configuration upon start-up on second routing engine 58B by hypervisor 22B.

In the example of FIG. 4A, primary VM 60A executes an OS 62A, such as a version of a network operating system. Standby VM 60B executes an OS 62B, which may be an instance of the same operating system executed by primary VM 60A. As the slave virtual machine, standby VM 60B may continually synchronize with primary VM 60A. In the illustrated example of FIG. 4A, standby VM 40B may synchronize with primary VM 60A via a connection 76 to update routing information 66B and protocols 68B based on routing information 66A and protocols 68A from primary VM 60A. Standby VM 60B may also synchronize with primary VM 60A via connection 76 to replicate state information in the form of a full memory state 74A. In some examples, connection 76 may comprise a high-speed internal Ethernet connection.

First routing engine 58A includes VM manager 70A and second routing engine 58B includes VM manager 70B to control a high availability graceful restart, including full memory replication and virtual machine switchover, for router 20B. In the illustrated example, VM manager 70A operates on top of kernel 24A, effectively alongside hypervisor 22A, to oversee the operation of primary VM 60A on first routing engine 58A. VM manager 70B operates on top of kernel 24B, effectively alongside hypervisor 22B, to oversee the operation of standby VM 60B on second routing engine 58B. In other examples, physical routing engines 58A-58B may include management virtual machines to control the high availability process. According to the techniques of this disclosure, during normal operation, VM manager 70A may periodically store a state of the entire memory of primary VM 60A, i.e., full memory state 74A, in storage 72A via hypervisor 22A. The stored full memory state 74A may include, for example, a memory page of all kernel states of OS 62A on primary VM 60A, an executable software image of primary VM 60A including a software system executed by primary VM 60A, and/or link states of primary VM 60A that comprise states of physical links between routers within a network. In this way, VM manager 70A may blindly store a current state of the entire memory, and does not need to store individual kernel states, including states of routes, next hops, interfaces, and the like. Storing each different kernel state may require knowledge of the kernel objects and their implementations via kernel 24A or processes executing thereon.

In the example illustrated in FIG. 4A, VM manager 70A may periodically checkpoint full memory state 74A of primary VM 40A in storage 72A of first routing engine 58A. Checkpointing enables the memory of primary VM 60A and the memory of standby VM 60B to periodically synchronize via connection 76 such that both virtual machines have the same memory. In one example, standby VM 60B may synchronize with memory pages of primary VM 60A to replicate full memory state 74A in storage 72A asynchronously with the periodic checkpointing of full memory state 74A from primary VM 60A.

Full memory state 74A may be checkpointed periodically according to a given interval of time. The time interval may be configurable based on a size of the memory of primary VM 60A to be stored and an overhead limit for router 20B. In some cases, only the first checkpoint of full memory state 74A needs to store a state of the entire memory of primary VM 60A. Subsequent checkpointing may only store incremental changes to the memory of primary VM 60A to capture the differences between two points in time.

Before, during, and after a graceful restart, VM manager 70A on primary VM 60A may use keep-alive or heartbeat mechanisms to monitor the health of primary VM 60A. More specifically, the heartbeat mechanisms may detect a failure of primary VM 60A. If a failure is detected on primary VM 60A, VM manager 70A may request hypervisor 22A to instigate a full memory replication from primary VM 60A to standby VM 60B via connection 76 and hypervisor 22B.

The full memory replication may include replicating full memory state 74A at the last checkpoint stored in storage 72A and merging the replicated memory state into standby VM 60B. In the case of a hot-standby high availability process, standby VM 60B is already in service on second routing engine 58B at the time of the failure. Full memory state 74A may be replicated and merged into standby VM 60B for standby VM 60B to immediately take control of the routing session for router 20B. In the case of a cold-standby high availability process, hypervisor 22B first initializes standby VM 60B on second routing engine 58B upon hypervisor 22A detecting the failure of primary VM 60A. Once standby VM 60B is running on second routing engine 58B, full memory state 74A may be replicated and merged into standby VM 60B for standby VM 60B to take control of the routing session for router 20B.

Replicating stored full memory state 74A instead of individual kernel states into standby VM 60B does not require knowledge of the features and kernel states stored in the memory of primary VM 60A or the implementation of the features and kernel states via kernel 24A or kernel 24B or processes executing thereon. Instead, VM manager 70B may blindly replicate full memory state 74A into standby VM 60B, which may include a memory page of all kernel states of OS 62A of primary VM 60A, an executable software image of primary VM 60A including a software system executed by primary VM 60A, and/or link states of primary VM 60A that comprise states of links between routers in a network that standby VM 60B may translate into kernel objects for whatever software system is executed by standby VM 60B.

High availability with full memory replication as described in this disclosure does not require individual kernel states to be maintained and replicated separately or manual kernel state replication implementation changes. The use of full memory replication may also reduce development time and cost because feature development is not tied to high availability graceful restart support. In addition, the fully memory replication operation may be performed via hypervisor 22A and hypervisor 22B upon request by VM manager 70A. In this way, OS 62A of primary VM 60A and OS 62B of standby VM 60B may be unaware of the full memory replication operation. The techniques, therefore, enable second routing engine 58A to provide high availability support for router 20B in a black box way.

The techniques may also eliminate the need to check that both virtual machines are running the same software system before performing a high availability switchover. Conventionally, in order to perform a graceful restart, a primary virtual machine and a standby virtual machine must be running the same software system. According to the techniques, full memory replication may include replicating an image of primary VM 60A including OS 62A executed by primary VM 60A to standby VM 60B. In this way, after the full memory replication, OS 62B executed by standby VM 60B will no doubt be the same as OS 62A executed by primary VM 60A. In addition, full memory replication may include replicating link states of primary VM 60A to standby VM 60B. The link states may comprise states of physical links between routers that define a network topology of a network, e.g., the links between routers 12 in network 10. Regardless of implementation changes between different releases of software systems, the network topology and the link states of the links between the routers that make up the network topology do not change. Standby VM 60B may then translate the link states into kernel objects for whatever software system, i.e., OS 62B, is executed by standby VM 60B. In this case, primary VM 60A and standby VM 60B may execute different software systems with different kernel state implementations and still support high availability.

Once full memory state 74A is replicated and merged into standby VM 60B via hypervisors 22A-22B, standby VM 60B may take control of the routing session for router 60A. More specifically, VM manager 70A may request hypervisors 22A-22B to switch control of the routing functionality for router 22B from primary VM 60A to standby VM 60B.

FIG. 4B illustrates second routing engine 58B with new primary VM 60B and first routing engine 58A with new standby VM 60A after the switchover. The titles of the virtual machines on respective routing engines 58A-B illustrated in FIG. 4B have been changed to reflect the new primary VM 60B and the new standby VM 60A. After the switchover, primary VM 60B may be run on second routing engine 58B to control the routing functionality and other functions of router 20B starting at full memory state 74B in storage 72B, which includes the last checkpoint of the memory of failed VM 60A. By starting operation at the exact state of the last checkpoint of the memory of failed VM 60A, router 20B may not need to perform additional features, such as non-stop forwarding, for new primary VM 60B to "catch-up" to the last state of the failed VM 60A.

VM manager 70B on second routing engine 58B may then request hypervisors 22B to communicate with hypervisor 22A to terminate standby VM 60A on first routing engine 58A. In the case of a cold-standby high availability process, a new standby VM 60A may only be re-initialized by hypervisor 22A upon hypervisor 22B detecting a failure of primary VM 60B. In the case of a hot-standby high availability process, VM manager 70B may request hypervisor 22B to communication with hypervisor 22A to immediately re-initialize standby VM 60A on first routing engine 58B. Standby VM 60A may provide hot-standby high availability for router 20B during operation of the routing session by primary VM 60B. In some cases, instead of terminating standby VM 60A, VM manager 70A may place standby VM 60A into a suspended state during which an operator may perform diagnostics to determine a cause of the failure. When the diagnostic testing is complete, VM manager 70A may then terminate standby 60A and, in the case of hot-standby, re-initialize a new instance of standby VM 60A on first routing engine 58A.

After the switchover is complete, VM manager 70B may begin periodically storing a state of the entire memory of primary VM 60B, i.e., full memory state 74B, in storage 72B via hypervisor 22B. VM manager 70B may store or checkpoint full memory state 74B in substantially the same manner as described above with respect to primary VM 60A of FIG. 4A. VM manager 70B may also use keep-alive or heartbeat mechanisms to monitor the health of primary VM 60B. If a failure is detected on primary VM 60B, VM manager 70B may request hypervisor 22B to instigate a full memory replication from primary VM 60B to standby VM 60A via connection 76 and hypervisor 22A.

Figure 5:
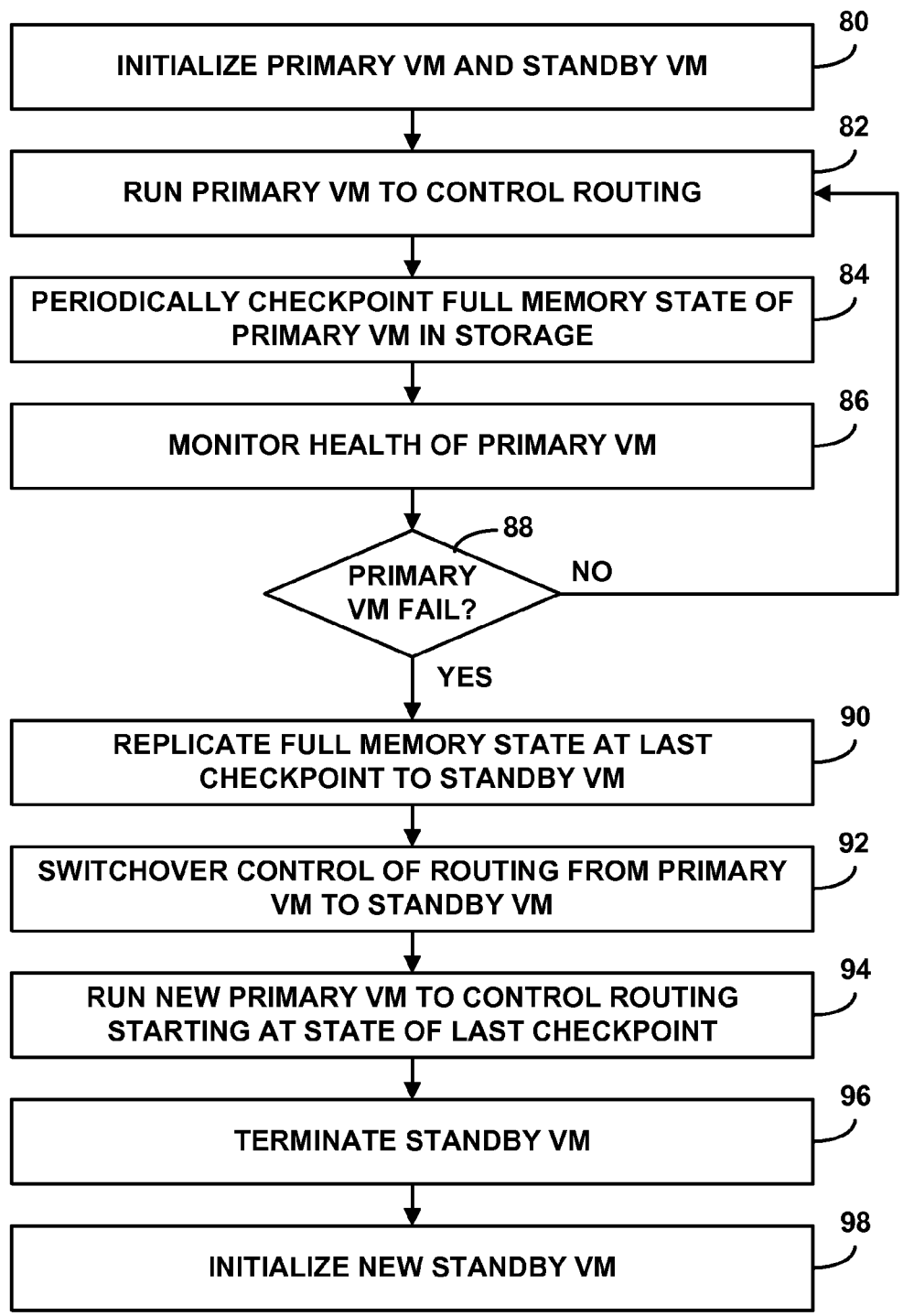
FIG. 5 is a flowchart illustrating an exemplary operation of a router during a failover with hot-standby high availability using full memory replication between virtual machine instances.

FIG. 5 is a flowchart illustrating an exemplary operation of a router during a failover with hot-standby high availability using full memory replication between virtual machine instances. The illustrated method will be described with respect to primary VM 40A and standby VM 40B on routing engine 21 of router 20A of FIGS. 3A-3B. In other examples, the method may also be performed with respect to primary VM 60A on first routing engine 58A and standby VM 60B on second routing engine 58B of router 20B of FIGS. 4A-4B.

In the case of hot-standby high availability, hypervisor 22 may initialize both primary VM 40A and standby VM 40B on routing engine 21 of router 20A at the same time (80). In this way, standby VM 40B may be ready and available to take over the routing functionality of router 20A upon a failure of primary VM 40A. Primary VM 40A and standby VM 40B may have a master/slave relationship such that standby VM 40B continually synchronizes with primary VM 40A via shared storage 52. Standby VM 40B must remain silent during operation of the routing session for router 20A by primary VM 40A. As the master virtual machine for router 20A, primary VM 40A may be run on routing engine 21 to control the routing functionality and other functions on behalf of router 20A (82). Router 20A may also include VM manager 50 to control the high availability process.

VM manager 50 may periodically checkpoint a full memory state 54 of primary VM 40A in storage 52 (84). The stored full memory state 54 may include, for example, one or more memory pages of all kernel states of OS 42A executing on primary VM 40A, an executable software image of primary VM 40A including a software system executed by primary VM 40A, and link states of primary VM 40A that comprise states of physical links between routers in a network. VM manager 50 may use keep-alive or heartbeat mechanisms to monitor the health of primary VM 40A (86). While a failure of primary VM 40A is not detected (NO branch of 88), primary VM 40A may continue to control the routing functionality of router 20A (82) and VM manager 50 may continue to periodically checkpoint full memory state 54 of primary VM 40A (84) and monitor the health of primary VM 40A (86).

When a failure of primary VM 40A is detected (YES branch of 88), hypervisor 22 replicates full memory state 54 at the last checkpoint stored in storage 52 to standby VM 40B (90). By replicating the stored full memory state 54 instead of individual kernel states, standby VM 40B may receive one or more memory pages of all kernel states of OS 42A on primary VM 40A, an executable software image of primary VM 40A including a software system executed by primary VM 40A, and/or link states of primary VM 40A that comprise states of physical links between routers in a network that standby VM 40B may translate into kernel objects for whatever software system is executed by standby VM 40B. In this way, the techniques may eliminate the need to check that both primary VM 40A and standby VM 40B are running the same software system before performing a high availability switchover.

Hypervisor 22 then switches control of the routing functionality for router 20A from primary VM 40A to standby VM 40B (92). After the switchover, new primary VM 40B may be run on routing engine 21 to control the routing functionality of router 20A starting at full memory state 54 of the last checkpoint in storage 52 (94). In this way, router 20A does not need to perform additional features, such as non-stop forwarding, for new primary VM 40B to "catch-up" to the last state of the failed primary VM 40A.

VM manager 50 may then request hypervisor 22 to terminate new standby VM 40A (96). After termination, VM manager 50 may request hypervisor 22 to re-initialize standby VM 40A on routing engine 21 (98). Standby VM 40A may provide hot-standby high availability for router 20A during operation of the routing session by primary VM 40B.

Figure 6:
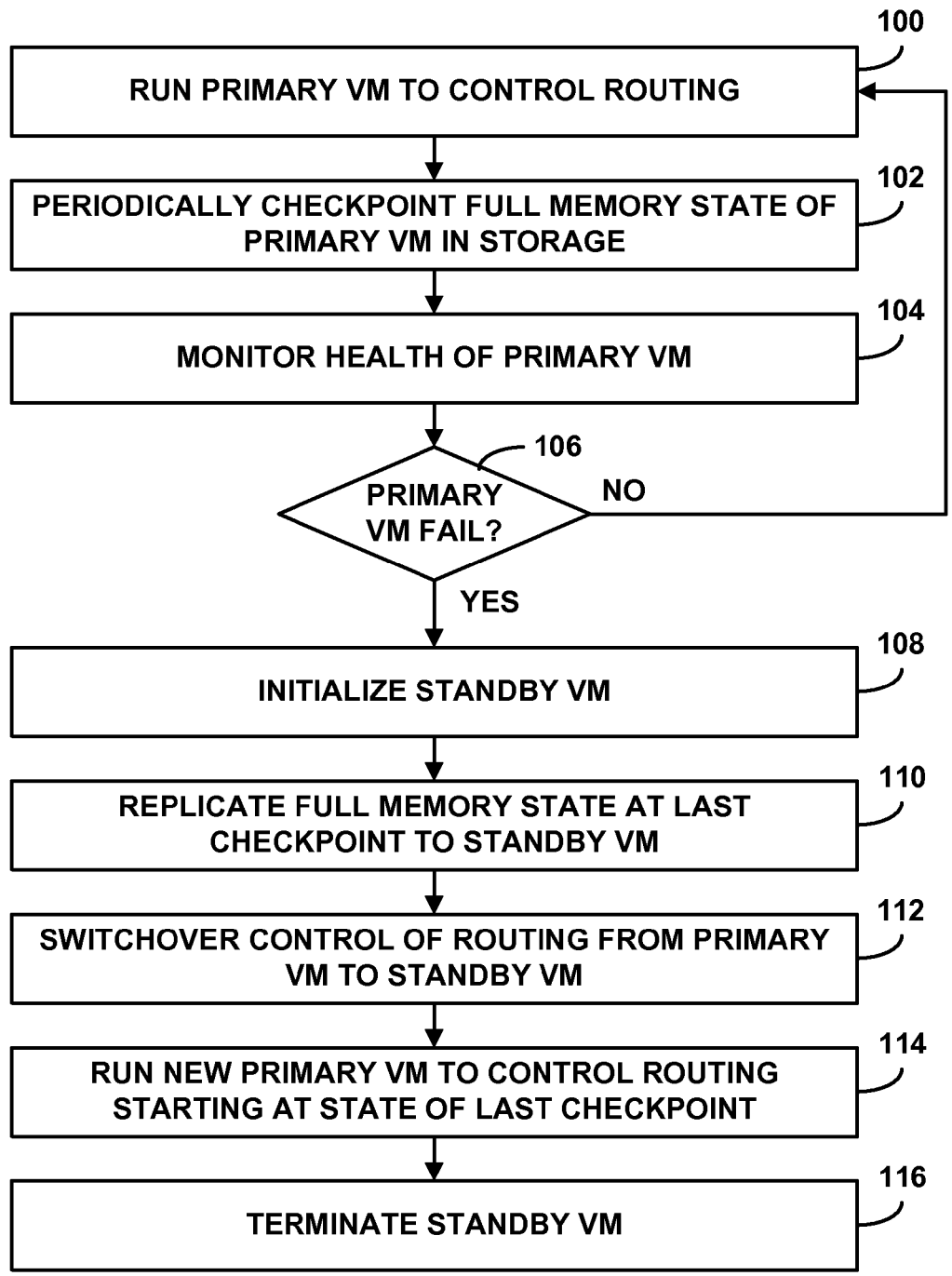
FIG. 6 is a flowchart illustrating an exemplary operation of a router during a failover with high availability using full memory replication between virtual machine instances.

FIG. 6 is a flowchart illustrating an exemplary operation of a router during a failover with high availability using full memory replication between virtual machine instances. The illustrated method will be described with respect to primary VM 40A and standby VM 40B on routing engine 21 of router 20A of FIGS. 3A-3B. In other examples, the method may also be performed with respect to primary VM 60A on first routing engine 58A and standby VM 60B on second routing engine 58B of router 20B of FIGS. 4A-4B.

In the case of high availability, hypervisor 22 may initialize standby VM 40B on routing engine 21 of router 20A only upon a failure of primary VM 40A. Initially, only primary VM 40A may be run on routing engine 21 to control the routing functionality and other functions on behalf of router 20A (100). For example, router 20A includes VM manager 50 that may control the high availability process.

VM manager 50 may periodically checkpoint a full memory state 54 of primary VM 40A in storage 52 (102). The stored full memory state 54 may include, for example, one or more memory pages of all kernel states of OS 42A on primary VM 40A, an executable software image of primary VM 40A including a software system executed by primary VM 40A, and link states of primary VM 40A that comprise states of physical links between routers in a network. VM manager 50 may use keep-alive or heartbeat mechanisms to monitor the health of primary VM 40A (104). While a failure of primary VM 40A is not detected (NO branch of 106), primary VM 40A may continue to control the routing functionality of router 20A (100) and VM manager 50 may continue to periodically checkpoint full memory state 54 of primary VM 40A (102) and monitor the health of primary VM 40A (104).

When a failure of primary VM 40A is detected (YES branch of 106), VM manager 50 requests hypervisor 22 to initialize standby VM 40B on routing engine 21 of router 20A (108). Primary VM 40A and standby VM 40B may have a master/slave relationship such that standby VM 40B synchronizes with primary VM 40A via storage 52. Once standby VM 40B is in service, hypervisor 22 replicates full memory state 54 at the last checkpoint stored in shared storage 52 to standby VM 40B (110). By replicating the stored full memory state 54 instead of individual kernel states, standby VM 40B may receive one or more memory pages of all kernel states of OS 42A on primary VM 40A, an executable software image of primary VM 40A including a software system executed by primary VM 40A, and/or link states of primary VM 40A that comprise states of physical links between routers in a network that standby VM 40B may translate into kernel objects for whatever software system is executed by standby VM 40B. In this way, the techniques may eliminate the need to check that both primary VM 40A and standby VM 40B are running the same software system before performing a high availability switchover.

Hypervisor 22 then switches control of the routing functionality for router 20A from primary VM 40A to standby VM 40B (112). After the switchover, new primary VM 40B may be run on routing engine 21 to control the routing functionality of router 20A starting at full memory state 54 of the last checkpoint in shared storage 52 (114). In this way, router 20A does not need to perform additional features, such as non-stop forwarding, for new primary VM 40B to "catch-up" to the last state of the failed primary VM 40A. VM manager 50 may then request hypervisor 22 to terminate new standby VM 40A (116).

In the above examples, the techniques for providing high availability using full memory replication between virtual machine on a network device are described as being performed within a physical device included in a physical network. In other examples, the techniques may be performed within a virtual device included in a virtual network. A virtual network or modeled network may be used to conduct testing of the disclosed high availability with full memory replication techniques and other techniques within a virtual device prior to implementation within a physical device. The virtual network may be constructed to model certain network conditions in order to test how the disclosed high availability with full memory replication techniques or other techniques within a network device may react. Moreover, the virtual device may be construed to test how the disclosed high availability with full memory replication techniques or other techniques react during different device failures, e.g., software and hardware failures. In some example, the virtual network and/or virtual device may also be used for teaching purposes.

Various examples of the invention have been described. These and other examples are within the scope of the following claims.

The invention claimed is:

1. A method comprising:
executing a first virtual machine (VM) within an operating environment on a network device, wherein the first VM controls routing functionality of the network device;
periodically storing a full memory state of the first VM, wherein the stored full memory state of the first VM comprises link states that comprise states of physical links between network devices in a network;
upon detecting a failure of the first VM, replicating the stored full memory state of the first VM to a second VM executing within the operating environment on the network device, wherein replicating the stored full memory state comprises replicating the link states of the first VM to the second VM, and translating, with the second VM, the link states into kernel objects for a software system executed by the second VM; and
switching control of the routing functionality from the first VM to the second VM.

2. The method of claim 1, wherein the first VM and the second VM are executing within the operating environment on a single control unit of the network device.

3. The method of claim 1, wherein the operating environment comprises a first operating environment, wherein the first VM is executing within the first operating environment on a first control unit of the network device, and the second VM is executing within a second operating environment on a second control unit of the network device.

4. The method of claim 1, further comprising, upon detecting a failure of the first VM, initializing the second VM on the network device.

5. The method of claim 1, further comprising initializing the first VM and the second VM on the network device at the same time, wherein the second VM remains silent during operation of the routing functionality by the first VM.

6. The method of claim 1, wherein, upon detecting a failure of the first VM, the second VM provides high availability for the network device by providing graceful restart between the first VM and the second VM.

7. The method of claim 1, further comprising, after switching control of the routing functionality to the second VM, terminating the first VM.

8. The method of claim 7, further comprising, after terminating the first VM, re-initializing the first VM on the network device to provide high availability for the network device during operation of the routing functionality by the second VM.

9. The method of claim 1, wherein replicating the stored full memory state of the first VM comprises replicating one or more memory pages that store all kernel states of an operating system kernel executing on the first VM to the second VM.

10. The method of claim 1, wherein the stored full memory state of the first VM comprises an executable software image of the first VM including a software system executed by the first VM, and wherein replicating the stored full memory state comprises replicating the executable software image of the first VM to the second VM.

11. The method of claim 1, further comprising, prior to detecting a failure of the first VM, periodically checkpointing one or more memory pages of the first VM with the stored full memory state.

12. The method of claim 11, wherein periodically checkpointing one or more memory pages of the first VM comprises periodically synchronizing the one or more memory pages of the first VM with one or more memory pages of the second VM.

13. The method of claim 1, wherein periodically storing a full memory state of the first VM comprises storing the full memory state after an interval of time, wherein the interval is configurable based on a size of the full memory state to be stored and an overhead limit for the network device.

14. A network device comprising:
a hypervisor that provides an operating environment for one or more virtual machines (VMs) on the network device;
a first VM executing within the operating environment of the hypervisor, wherein the first VM controls routing functionality of the network device and periodically stores a full memory state of the first VM, wherein the stored full memory state of the first VM comprises link states that comprise states of physical links between network devices in a network; and
a second VM executing within the operating environment of the hypervisor, wherein, upon detecting a failure of the first VM, the hypervisor replicates the link states of the stored full memory state of the first VM to the second VM, and switches control of the routing functionality from the first VM to the second VM, and wherein the second VM translates the link states into kernel objects for a software system executed by the second VM.

15. The network device of claim 14, further comprising a control unit, wherein the first VM and the second VM are executing within the operating environment of the hypervisor on the control unit.

16. The network device of claim 14, wherein the hypervisor comprises a first hypervisor, further comprising:
a first control unit, wherein the first VM is executing within the operating environment of the first hypervisor on the first control unit; and
a second control unit, wherein the second VM is executing within an operating environment of a second hypervisor on the second control unit.

17. The network device of claim 14, wherein, upon detecting a failure of the first VM, the hypervisor initializes the second VM on the network device.

18. The network device of claim 14, wherein the hypervisor initializes the first VM and the second VM on the network device at the same time, wherein the second VM remains silent during operation of the routing functionality by the first VM.

19. The network device of claim 14, wherein, upon detecting a failure of the first VM, the second VM provides high availability for the network device by providing graceful restart between the first VM and the second VM.

20. The network device of claim 14, wherein, after switching control of the routing functionality to the second VM, the hypervisor terminates the first VM.

21. The network device of claim 20, wherein, after terminating the first VM, the hypervisor re-initializes the first VM on the network device to provide high availability for the network device during operation of the routing functionality by the second VM.

22. The network device of claim 14, wherein the hypervisor replicates one or more memory pages that store all kernel states of an operating system kernel executing on the first VM to the second VM.

23. The network device of claim 14, wherein the hypervisor replicates an executable software image of the first VM including a software system executed by the first VM to the second VM.

24. The network device of claim 14, wherein, prior to detecting a failure of the first VM, the first VM periodically checkpoints one or more memory pages with the stored full memory state.

25. The network device of claim 24, wherein the first VM periodically synchronizes the one or more memory pages with one or more memory pages of the second VM.

26. The network device of claim 14, wherein the first VM stores the full memory state after an interval of time, wherein the interval is configurable based on a size of the full memory state to be stored and an overhead limit for the network device.

27. A non-transitory, computer-readable storage medium comprising instructions that cause one or more programmable processors to:
- execute a first virtual machine (VM) within an operating environment on a network device, wherein the first VM controls routing functionality of the network device;
- periodically store a full memory state of the first VM, wherein the stored full memory state of the first VM comprises link states that comprise states of physical links between network devices in a network;
- upon detecting a failure of the first VM, replicate the stored full memory state of the first VM to a second VM executing within the operating environment on the network device, wherein the instructions cause the processors to replicate the link states of the first VM to the second VM, and translate, with the second VM, the link states into kernel objects for a software system executed by the second VM; and
- switch control of the routing functionality from the first VM to the second VM.

* * * * *